(12) United States Patent
Ewles

(10) Patent No.: US 8,757,948 B2
(45) Date of Patent: Jun. 24, 2014

(54) TIE-DOWN DEVICES FOR SECURING A VEHICLE

(75) Inventor: Adam Ewles, Yorba Linds, CA (US)

(73) Assignee: Bar Cuffs, Inc., Yorba Linda, CA (US)

( * ) Notice: Subject to any disclaimer, the term of this patent is extended or adjusted under 35 U.S.C. 154(b) by 0 days.

(21) Appl. No.: 13/112,713

(22) Filed: May 20, 2011

(65) Prior Publication Data

US 2012/0294691 A1 Nov. 22, 2012

(51) Int. Cl.
*B60P 7/08* (2006.01)

(52) U.S. Cl.
USPC .............................................. 410/120; 410/3

(58) Field of Classification Search
CPC ........ B60P 3/073; B60P 3/079; B60P 7/0807; B61D 45/00; B60R 9/08
USPC ............. 410/2–4, 7, 9–11, 19–23, 77, 81, 97, 410/99, 100, 106, 120; 248/231.51, 230.4, 248/228.4, 214, 313, 229.13, 316.5, 229.23, 248/689, 62, 63, 74.1, 74.2, 74.3, 68.1; 224/402–404, 536, 558, 420, 424, 425, 224/570, 924; 24/265 CD, 339, 483, 24, 24/484, 489, 517
See application file for complete search history.

(56) References Cited

U.S. PATENT DOCUMENTS

| | | | |
|---|---|---|---|
| 1,497,564 A | 6/1924 | Howells | |
| 2,366,041 A * | 12/1944 | Morehouse | |
| 4,072,257 A | 2/1978 | Hall | |
| 4,078,821 A | 3/1978 | Kitterman | |
| 4,243,243 A | 1/1981 | Edmisten | |
| 4,441,736 A | 4/1984 | Shedden | |
| 4,580,935 A | 4/1986 | Treihaft | |
| 4,611,961 A | 9/1986 | Van Iperen et al. | |
| 4,752,177 A | 6/1988 | Zenna | |
| 4,842,458 A | 6/1989 | Carpenter | |
| 4,852,779 A | 8/1989 | Berg | |
| 5,230,449 A | 7/1993 | Collins et al. | |
| 5,326,202 A | 7/1994 | Stubbs | |
| 5,529,448 A | 6/1996 | Kosma | |
| 6,065,914 A | 5/2000 | Fotou | |
| 6,171,034 B1 | 1/2001 | Burgoon et al. | |
| 7,322,780 B2 * | 1/2008 | Hill | 410/97 |
| 2005/0117989 A1 | 6/2005 | Ewles | |

FOREIGN PATENT DOCUMENTS

EP 1623915 2/2006

* cited by examiner

*Primary Examiner* — Stephen Gordon
(74) *Attorney, Agent, or Firm* — Fish & Tsang LLP

(57) ABSTRACT

The inventive subject matter relates to novel tie-down devices for securing a vehicle to a surface. In one preferred aspect of the inventive subject matter, the tie-down device is a clamp comprising a first half-clamp pivotally coupled to a second half-clamp. Each half-clamp has an inner lining for protecting the vehicle from damage, and an opening for receiving a fastener. The inner linings of each half-clamp are also sized and dimensioned to come into juxtaposing contact with one another before the half-clamp openings are completely overlapping. In this manner, the tie-down device is configured to snugly grip a vehicle member as a fastener disposed through the half-clamp openings is tensioned.

14 Claims, 7 Drawing Sheets

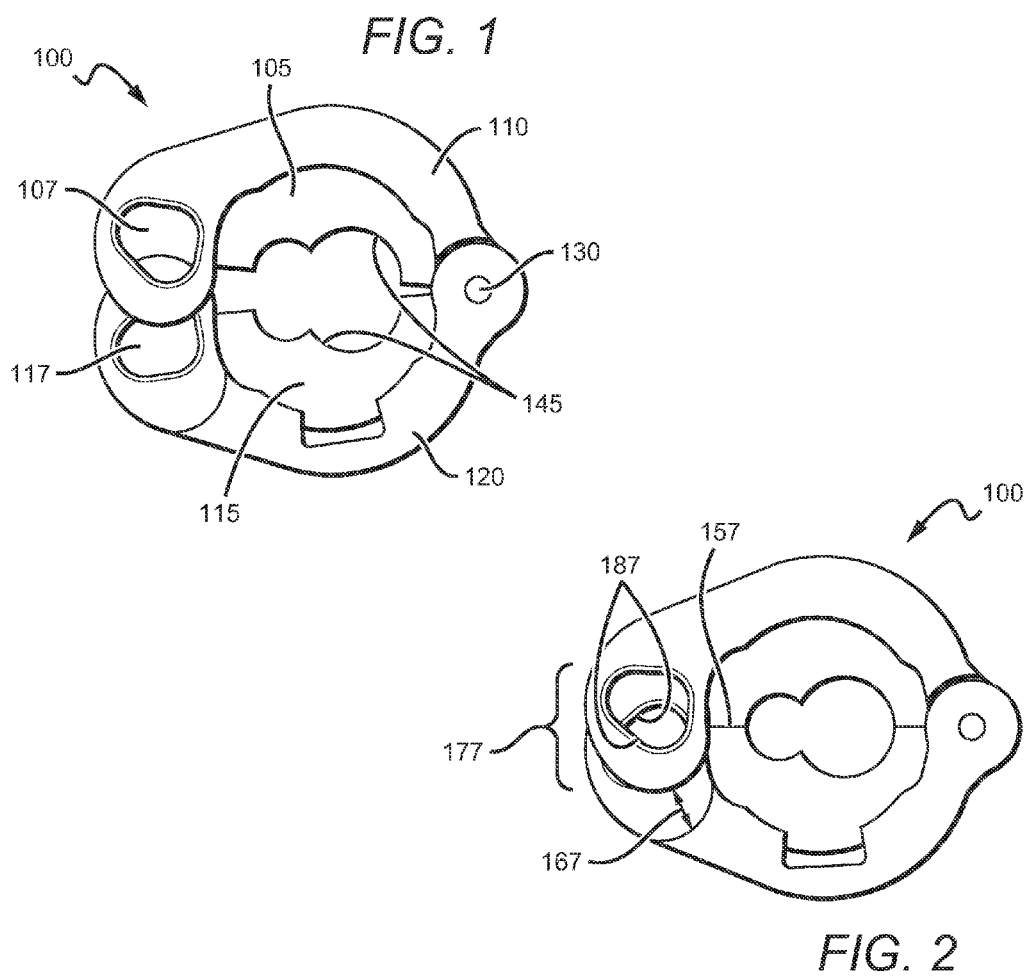
FIG. 1
FIG. 2
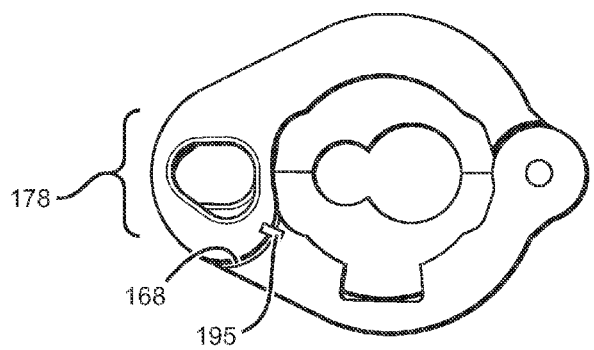
FIG. 3

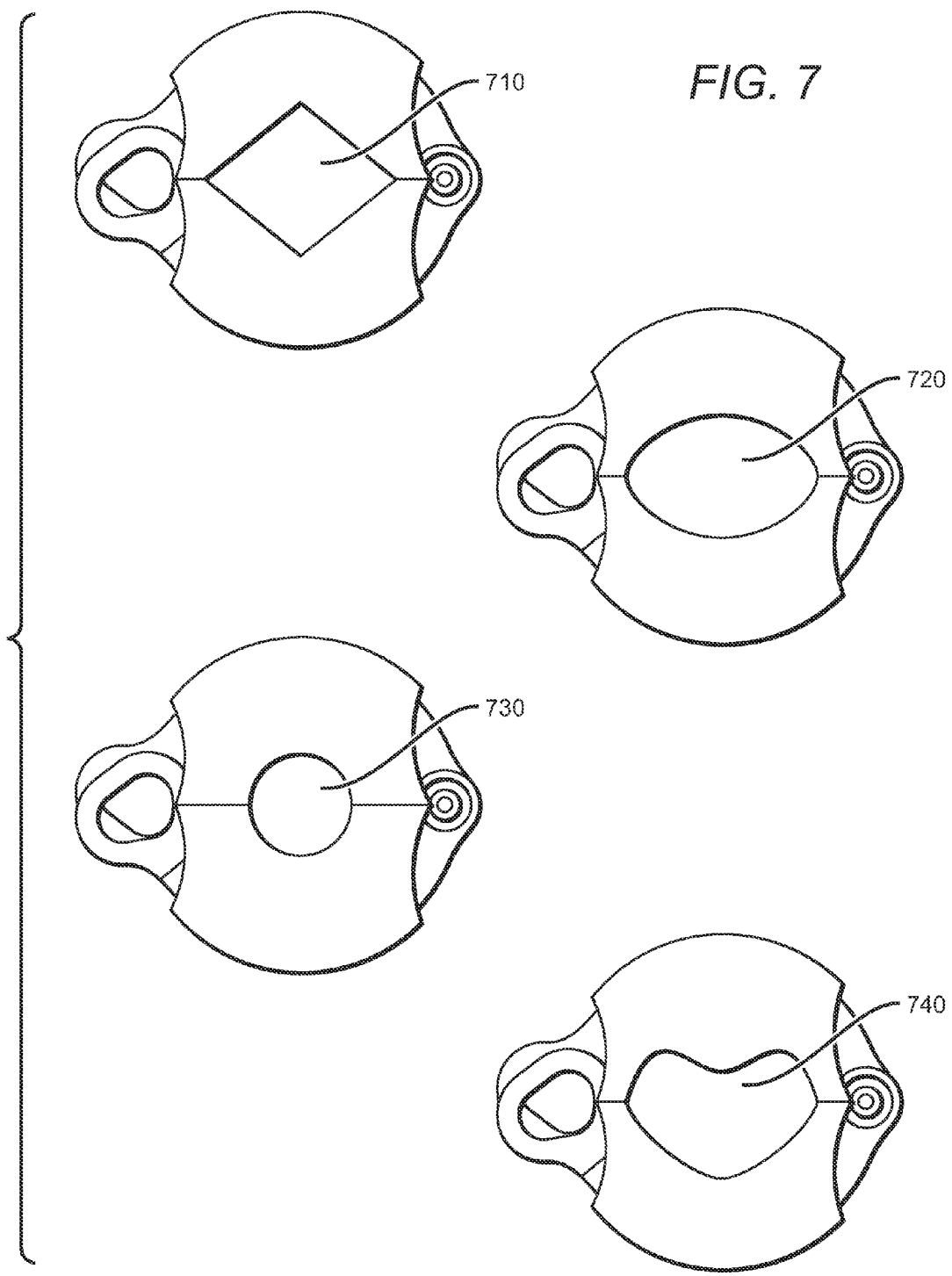

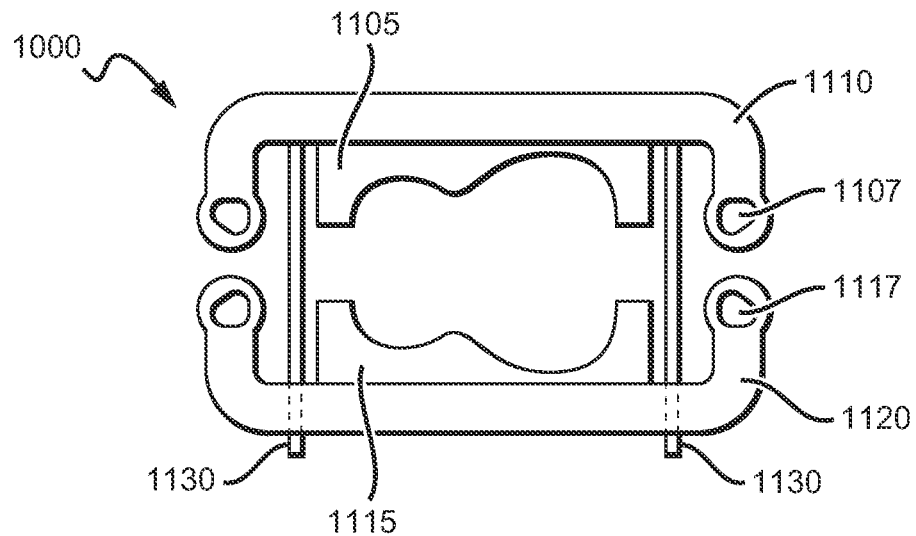
FIG. 10a
FIG. 10b
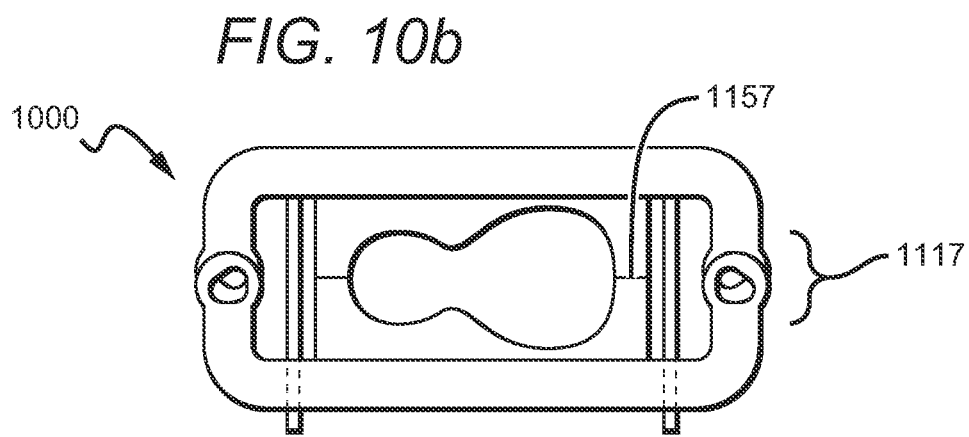

TIE-DOWN DEVICES FOR SECURING A VEHICLE

FIELD OF THE INVENTION

The field of the invention is tie-down technologies.

BACKGROUND

Cargo such as wheeled vehicles can be difficult to adequately secure for transport, for example in or on a truck or trailer bed surface. One reason wheeled vehicles are difficult to secure for transportation is the lack of adequate places on the vehicle for securely attaching fasteners such as ropes, cords, belts, straps, and the like. There are many devices for restraining a vehicle to a truck or trailer bed during transport. Examples include U.S. Pat. Nos. 4,072,257; 4,078,821; 4,243,243; 4,441,736; 4,580,935; 4,611,961; 4,752,177; 4,842,458; 4,852,779; 5,230,449; 5,326,202; 5,529,448; 6,065,914; and 6,171,034.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Various disadvantages remain in known tie-down technologies. U.S. Pat. No. 4,078,821 to Kitterman, for example, discloses a utility trailer having a built-in tie-down mounting system for securing vehicles to the trailer. Kitterman requires the user to purchase an entire trailer, which is not a practical solution for someone who already owns a truck or trailer. Kitterman fails to provide a tie-down device that is separate from the trailer, and is compatible with existing trailers and trucks.

U.S. Pat. No. 4,580,935 to Treihaft, discloses a tie-down system for securing up to four three-wheeled motorcycles onto a truck bed. The system includes several securing plates that must be bolted onto the truck bed. Since many truck owners are not willing to make substantial modifications to their trucks, the system in Treihaft has limited applicability. Furthermore, the system in Treihaft is specifically designed for securing three-wheeled vehicles and may not work with other kinds of vehicles and machinery. In sum, Treihaft fails to provide a tie-down device that is compatible with different types of vehicles does not require substantial modifications of the trailer.

U.S. Pat. No. 5,326,202 to Stubbs discloses a strapping system having two interconnected straps with cuffs for engaging motorcycle handle bars in order to maintain the motorcycle in an upright position during transport. The strapping system in Stubbs is limited to use with handle bars and fails to provide a fastener that can couple to vehicle members other than handle bars, such as struts, tailpipes, cross beams, axles, rails, frames, etc.

U.S. Pat. No. 6,065,914 to Fotou discloses a tie-down apparatus having an adjustable tensioner for securing a vehicle to a trailer. The attachment points are two rigid hooks that can be placed around elongated members of the vehicle. Fotou fails to provide an attachment device that snugly and securely grips a member of the vehicle. Furthermore, the hooks in Fotou can scratch the vehicle.

U.S. Pat. No. 6,171,034 to Burgoon discloses a tie-down device that has a locking mechanism for providing security and inhibiting theft. The device has two clamp halves pivotally connected by a hinge, and scratch-resistant material interlining the clamp halves. While Burgoon advantageously provides a tie-down device that snugly grips a vehicle member, the Burgoon device requires two separate steps: one for clamping the vehicle and another for tensioning a fastener that secures the vehicle to a trailer.

U.S. Pat. No. 1,497,564 to Howells discloses a tie-down device for securing a bundle of pipes to the exterior of a truck. The tie-down device comprises two ring sections pivotally joined and configured to clamp around the bundle of pipes. The ring sections also have interlocking ears with openings for receiving a securing element (e.g., pin) in order to lock the two ring sections together. Howells fails to provide a clamp that snugly grips or squeezes an elongated member. Howells also fails to provide a scratch-resistant lining for protecting the pipes.

U.S. Patent Application Publication No. 2005/0117989 to Ewles discloses a tie-down device that clamps to an elongated member of a vehicle, thus providing an attachment point for securing the vehicle to a surface via a fastener. The tie-down device in Ewles advantageously includes linings to prevent metal-to-metal contact between the clamp and the vehicle, thus preventing the vehicle from scratching. However, the tie-down device in Ewles must be clamped to the vehicle and then fastened to the surface in two separate steps. Ewles fails to provide a tie-down device that snugly grips a vehicle as the device is tensioned to a surface.

Thus, present tie-down systems leave much to be desired. Specifically, known devices tend to suffer from at least one of the following problems: (i) the devices are overly complex and require many steps to secure a vehicle to a platform; (ii) the devices fail to securely grip a vehicle member as the device is tensioned to a platform; (iii) the devices scratch the vehicle's paint or otherwise damages the vehicle; (iv) the devices require modification of the trailer/platform; (v) the devices require a custom trailer/platform; or (vi) the devices are not capable of griping different kinds of vehicle members.

Accordingly, the inventive subject matter addresses shortcomings in the known technology by providing a tie-down device that securely clamps to an elongated, substantially rigid member of the vehicle, thus providing an attachment point for a fastener. The tie-down device is advantageously configured to grip the vehicle member tighter as the fastener is tensioned to a trailer, truck bed, or platform. The tie-down device thus combines the step of tensioning a fastener with clamping a tie-down device and simplifies the process. In addition, the tie-down device is configured with lining in order to prevent the vehicle paint and surface finish from scratching.

Thus, there is still a need for tie-down device that snugly grips a vehicle member as a fastener connecting the device to a trailer is tensioned, without scratching the vehicle.

SUMMARY OF THE INVENTION

The inventive subject matter provides apparatus, systems and methods in which a tie-down device for a vehicle comprises a first half-clamp moveably coupled to a second half-clamp. Each of the half-clamps have a lining that is sized and dimensioned to prevent the first and second half-clamps from securely closing absent a deformation of one of the first and second linings. Each of the half-clamps also have an opening designed to receive a fastener or tensioner, such as a rope. The openings are preferably shaped such that opposing inclined surfaces are provided when the openings are overlapped in a non-secure closed position. The opposing inclined surfaces facilitate bringing the half-clamps into a securely closed position when a fastener is fed through the openings and pulled.

As used herein, the term "securely closing" means first and second half-clamps come into juxtaposing contact with one another. For example, where the first and second half-clamps are moveably coupled via a pivoting coupler, "securely closing" means first and second half-clamps have been rotated into juxtaposing contact with one another such that they are prevented from further rotation towards one another. In embodiments where the first and second half-clamps are moveably coupled via a linear coupler, "securely closing" means first and second half-clamps have been linearly translated towards one another until brought into juxtaposing contact. One of skill in the art will appreciate that a tie-down device can be "securely fastened" to a vehicle even though the first and second half-clamps are not "securely closed." For example, the half-clamp linings can grip a member of the vehicle with sufficient force to provide a "secure fastening," despite the fact that the half-clamps are not in juxtaposing contact.

As used herein, the terms "non-securely closed" and "partially closed" mean the linings have been brought into juxtaposing contact with one another and the half-clamps have not been brought into juxtaposing contact with one another. Although not required, "non-securely closed" and "partially closed" preferably means that half-clamp openings are in a partially overlapping position.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a perspective view of one embodiment of an exemplary tie-down device.

FIG. 2 is a perspective view of the exemplary tie-down device of FIG. 1 in a "non-securely closed" or "partially closed" position.

FIG. 3 is a perspective view of the exemplary tie-down device of FIG. 1 in a "securely closed" position.

FIG. 7 shows various shapes formed by different contours of the interior surfaces of linings.

FIG. 10a is a side view of one exemplary embodiment of a tie-down device, wherein two half-clamps are coupled via a linear coupler.

FIG. 10b is a side view of the tie-down device of FIG. 10a in a "non-securely closed" or "partially closed" position.

DETAILED DESCRIPTION

Figure 4:
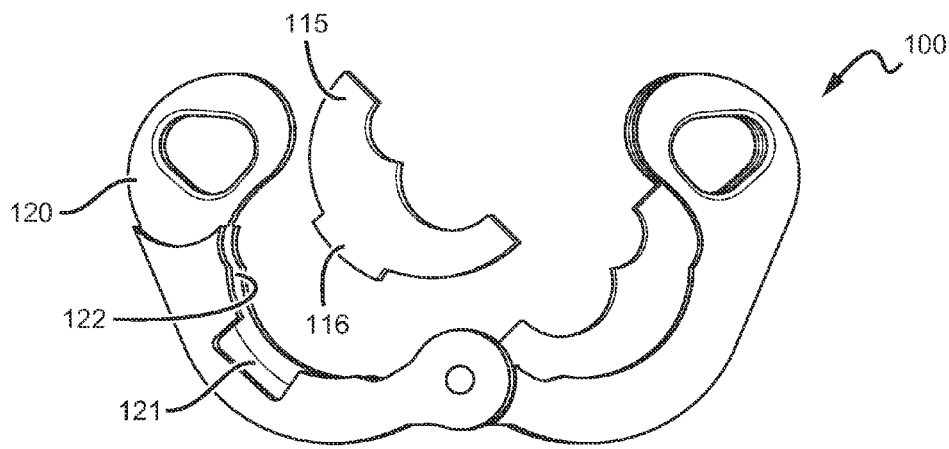
FIG. 4 is a perspective view of the exemplary tie-down device of FIG. 1 with a lining removed.

FIG. 1 shows a tie-down device 100 having a first half-clamp 110 and a second half-clamp 120 pivotally coupled together at a coupler 130. First half-clamp 110 has a first lining 105 and a first opening 107. Likewise, second half-clamp 120 has a second lining 115 and a second opening 117. Tie-down device 100 is configured to clamp to a member of a vehicle and is useful in providing an attachment point for securing the vehicle to a platform, such as a trailer or truck bed.

First and second half-clamps 110 and 120 can be made of metal, wood, plastic, composite, or any other material having a material strength suitable for performing as a tie-down device. The particular material property requirements will depend on the weight of the vehicle, size of the vehicle, and other factors. In some embodiments, half-clamps 110 and 120 are made of a corrosive-resistant material. In yet other embodiments, half-clamps 110 and 120 are made of a material selected to endure extreme temperature changes.

First and second half-clamps 110 and 120 can be manufactured by a milling, die-cast, injection molding, or any other process suitable for producing a half-clamp having a material strength sufficient to function as a tie-down device.

First and second half-clamps 110 and 120 are preferably fungible parts in order to simplify manufacturing processes and reduce costs. However, it is also contemplated that half-clamps 110 and 120 can be non-fungible parts.

Coupler 130 provides a pivoting axis and allows half-clamps 110 and 120 to rotate with respect to one another. In one embodiment, coupler 130 comprises a pin through holes on the first and second half-clamps 110 and 120 (e.g., a hinge). Coupler 130 can further comprise a bushing, bearings, or other intermediary material configured to reduce friction between rotating remembers. Coupler 130 is preferably configured to prevent dirt, dust, and sand from entering the space between moving members. Rotating couplers are well known and those of skill in the art will appreciate that numerous configurations of couplers can be used consistently with the inventive concepts discussed herein.

Linings 105 and 115 are configured to come in contact with, and wrap around, a vehicle member (e.g., a handle bar, strut, axle, frame, rail, etc). The vehicle member is placed in between linings 105 and 115 and the vehicle member is clamped by linings 105 and 115 when first half-clamp 110 is rotated into second half-clamp 120 in a juxtaposing manner. Linings 105 and 115 are preferably sized and dimensioned to prevent metal-to-metal contact between half-clamps 110 and 120, and a vehicle member. Recessed interior surfaces 145 are contoured to conform to the cross-sectional shape of the vehicle member so that the vehicle member is snugly gripped by linings 105 and 115. While the recessed interior surfaces of the linings shown in FIGS. 1-6 are multi-lobed, any contour suitable for gripping a vehicle member is contemplated (see FIG. 7).

Linings 105 and 115 can be made of plastic, rubber, or any other material having an elastic deformation range suitable for providing a snug and secure grip on a vehicle member. The material is preferably scratch resistant in order to prevent scratching of the vehicle's paint or surface finish. Furthermore, the material is preferably selected to prevent damage to vehicle from excessive clamping of the vehicle member.

Contemplated vehicles include, but are not limited to, recreation vehicles such as snowmobiles, wave runners, jet skis, motorcycles, three-wheel and four-wheel all terrain vehicles (ATVs), dune buggies, go karts, drag cars, race cars, trucks, or even bicycles. However, one of skill in the art will appreciate that the inventive concepts taught herein can be applied to other vehicles not mentioned above, and even non-vehicles, such as, equipment, machinery, or any other object that needs to be tied down.

FIG. 2 shows tie-down device 100 in a "non-securely closed" position. First and second linings 105 and 115 are in juxtaposing contact at contact point 157. In contrast, first and second half-clamps 110 and 120 are not yet in juxtaposing contact, as shown by gap 167. Moreover, first and second openings 107 and 117 are not yet completely overlapping as shown by the partially overlapping position 177. First and second linings 105 and 115 are specifically sized and dimensioned to come into juxtaposing contact with one another before half-clamps 110 and 120 come into juxtaposing contact, and before openings 107 and 117 completely overlap. As such, linings 105 and 115 must be deformed in order to bring openings 107 and 117 into a completely overlapping position (see FIG. 3).

Openings 107 and 117 are shaped as triangles with rounded corners. Openings 107 and 117 are configured to receive a fastener, such as a rope. When openings 107 and 117 are in the partially overlapping position 177, a user can feed a fastener through the openings and pull on the fastener, thus bringing linings 105 and 115 into juxtaposing contact. As the user continues to provide tension to the fastener, linings 105 and 115 are elastically deformed and half-clamps 110 and 120 are eventually brought into a securely closed position. Linings 105 and 115 preferably have an elastic deformation range suitable for allowing openings 107 and 117 to completely overlap with little or no permanent (i.e., plastic) deformation of linings 105 and 115.

The shape of openings 107 and 117 are especially configured such that two opposing inclined surfaces 187 (see FIG. 2) are formed when openings 107 and 117 are in the partially overlapping position 177 (see FIG. 2). Opposing inclined surfaces 187 overlap to create an intersecting angle of about 45 degrees. The small angle advantageously provides a more direct translation of force from a fastener to linings 105 and 115, with little regard for the direction the fastener is pulled in with respect to tie-down device 100.

FIG. 3 shows tie-down device 100 in a securely closed position. Half-clamps 110 and 120 are in juxtaposing contact 168 and openings 107 and 117 are in a completely overlapping position 178. One of skill in the art will appreciate that it is not necessary that openings 107 and 117 be in a completely overlapping position in order for tie-down device 100 to securely fasten to a vehicle or to be in a securely closed position. Thus, embodiments in which openings 107 and 117 are never completely overlapping are also contemplated.

Tie-down device 100 can also be equipped with a locking mechanism 195, configured to keep half-clamps 110 and 120 in a securely closed position. Lock 195 can comprise a mechanical lock, magnetic lock, chemical lock, or any other locking device suitable for removeably affixing half-clamp 110 to half-clamp 120. Locking mechanisms are well known and numerous configurations can be used with the inventive subject matter taught herein.

FIG. 4 shows tie-down device 100 with lining 115 removed from second half-clamp 120. Lining 115 has a protrusion 116 configured to engage a notch 121 of half-clamp 120. Half-clamp 120 also has a groove 122 configured to engage a side of lining 115. In this manner, lining 115 can be removeably coupled to half-clamp 120 by pressing lining 115 into notch 121 and groove 122. Lining 115 can be easily removed from half-clamp 120 by pulling lining 115 out of notch 121 and groove 122. As such, lining 115 can be quickly and easily removed and advantageously replaced with other linings having different shapes, peripheral contours, materials, and configurations, depending on the vehicle and application. One of skill in the art will appreciate that fasteners other than notches and grooves can be used to removeably couple lining 115 to half-clamp 120. For example, hook and loop fasteners, magnet fasteners, adhesives, and mechanical fasteners can all be used in a manner consistent with the inventive subject matter. In preferred embodiments, the linings are integral with the half-clamps. In yet other embodiments, the linings are sold separately from the half-clamps.

Figure 5:
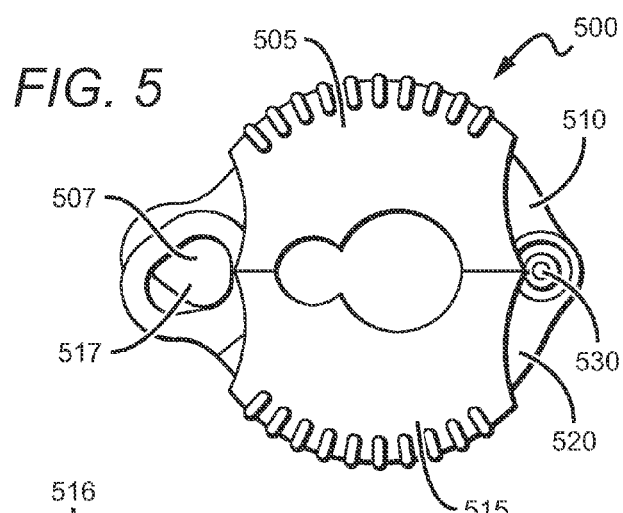
FIG. 5 is a perspective view of another exemplary tie-down device.

FIG. 5 shows a tie-down device 500 having similar features as tie-down device 100, namely; first and second clamps 510 and 520 pivotally coupled via a coupler 530; first and second linings 505 and 515 removeably coupled to half-clamps 510 and 520, respectively; and first and second openings 507 and 517 shown in a partially overlapping position. Tie-down device 500 differs from tie-down device 100 in that linings 505 and 515 are configured as an over-molding of half-clamps 510 and 520, meaning that linings 505 and 515 have a greater width than that of half-clamps 510 and 520. Tie-down device 500 also differs from tie-down device 100 in that half-clamps 510 and 520 are die-cast manufactured while half-clamps 110 and 120 are machine milled.

Figure 6:
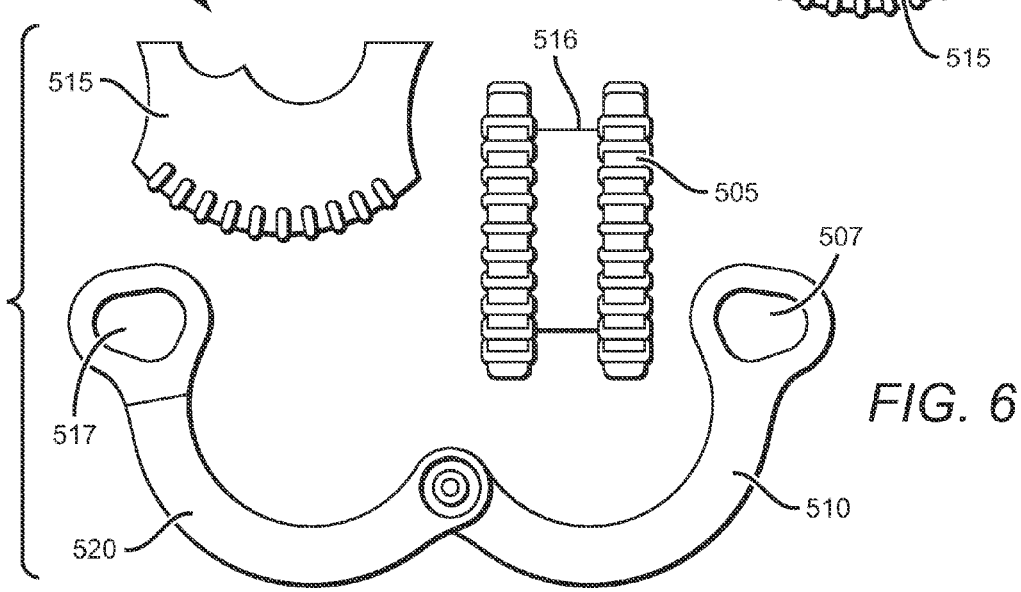
FIG. 6 is a perspective view of the exemplary tie-down device of FIG. 5 with the linings removed.

FIG. 6 shows tie-down device 500 with linings 505 and 515 removed from half-clamps 510 and 520. Lining 505 has a channel 516 for mating with a portion of half-clamp 510. When half-clamp 510 is pressed into channel 516, lining 505 surrounds half-clamp 510, thus reducing the possibility that a portion of half-clamp 510 come into direct contact with a portion of the vehicle. In this manner, over-mold linings 505 and 515 provide a scratch-resistant barrier to prevent tie-down device 500 from scratching a vehicle. Channel 516 also provides a removable fastener so that lining 505 can be removed and replaced with a lining having a different interior surface contour, or alternatively, so that tie-down device 500 can be used without any linings.

In additional to the over-mold linings of tie-down device 500 and the insert moldings of tie-device 100, other lining configurations can also be used in a manner that is consistent with the inventive subject manner. In preferred embodiments, an integrated half-clamp and lining is manufactured by placing the half-clamp in a mold and injection molding a rubber around the half-clamp, thus permanently affixing a lining around the half-clamp.

FIG. 7 shows four embodiments of tie-down devices in a substantially closed position. Each embodiment shows a different configuration for linings, wherein each lining has an interior surface that has been contoured to create a particular shape when the tie-down device is in a substantially closed position. Shape 710 comprises a diamond; shape 720 comprises an ellipse; shape 730 comprises a circle; and shape 740 comprises an irregular polygon. Shape 740 shows how non-identical linings can be used to create a non-symmetrical shape. One of skill in the art will appreciate that numerous shapes can be formed and used consistently with the inventive subject matter discussed herein. Shapes 710, 720, 730, and 740 preferably coincide with a cross sectional area of a vehicle member, such as a handle bar. However, embodiments in which shapes 710 do not conform to the cross-sectional area of a vehicle member are also contemplated. In some embodiments, the shape is configured to only contact the vehicle member at specific points.

Figure 8A:
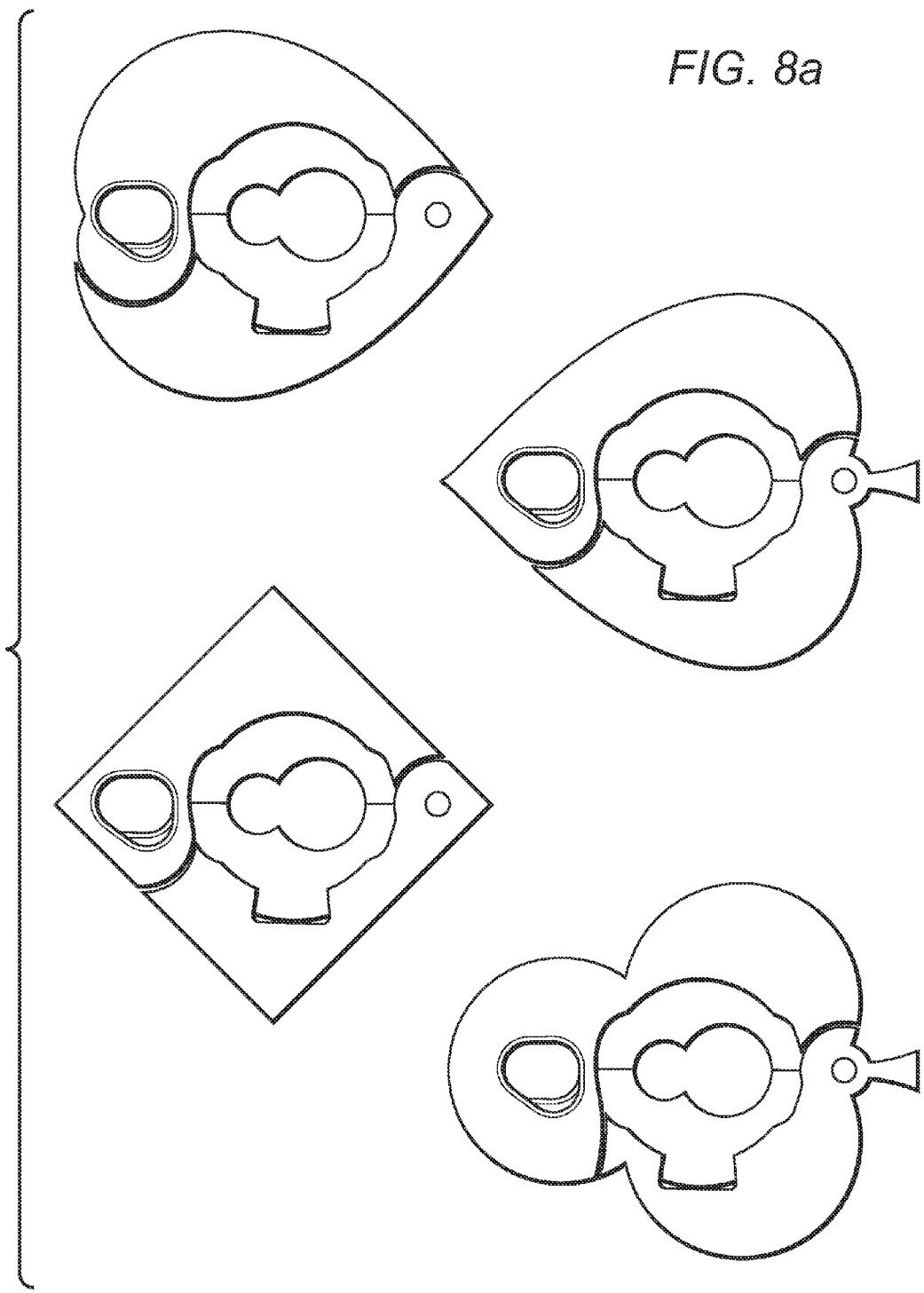
FIGS. 8a-8c show various shapes for the exterior surfaces of half-clamps.
Figure 8B:
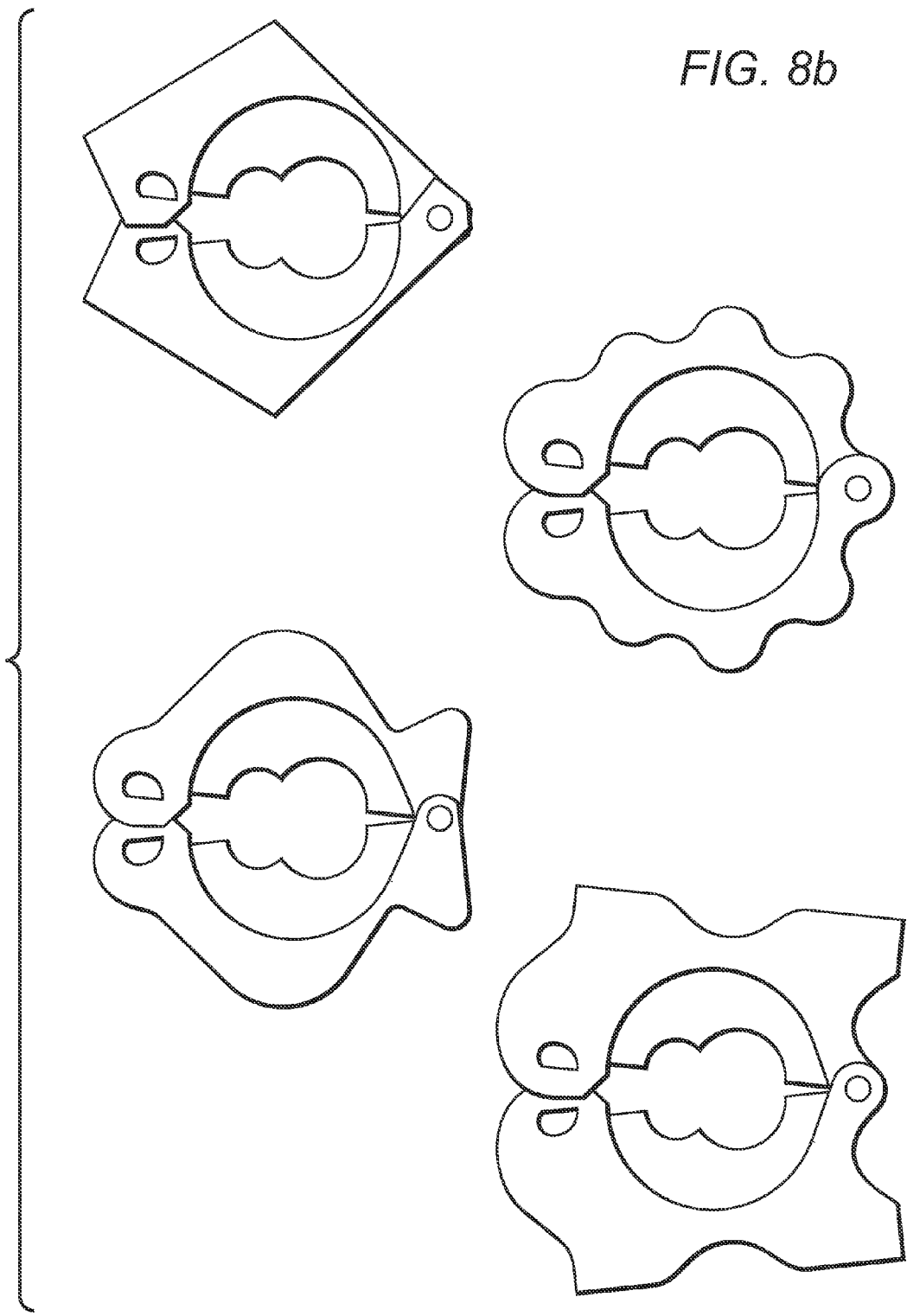
Figure 8C:
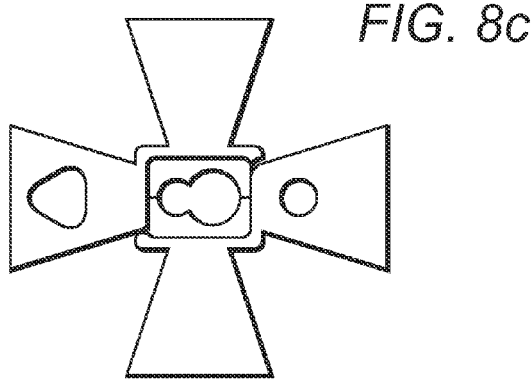

FIGS. 8a-8c show numerous embodiments of tie-down devices having half-clamps with differently contoured exterior surfaces. One of skill in the art will appreciate that shapes and contours other than those shown can be used consistently with the inventive concepts taught herein. Such shapes can be configured to provide an esthetic appeal or to provide function, such as for better griping and handling or to avoid interference with vehicle components. In FIG. 8a, the half-clamp exterior surfaces are made to resemble card suites (e.g., hearts, diamonds, clovers, spades). In FIG. 8c, the half-clamps are shaped to resemble a maltese cross. In embodiments where the linings are an over-molding of the half-clamps, the linings can be shaped and contoured to provide a desired exterior shape. Preferably, the half-clamps are fungible (e.g., the parts are physically and/or functionally identical) in order to simplify manufacturing process and reduce costs. However, non-fungible and non-identical half-clamp exterior shapes are also contemplated.

Figure 9:
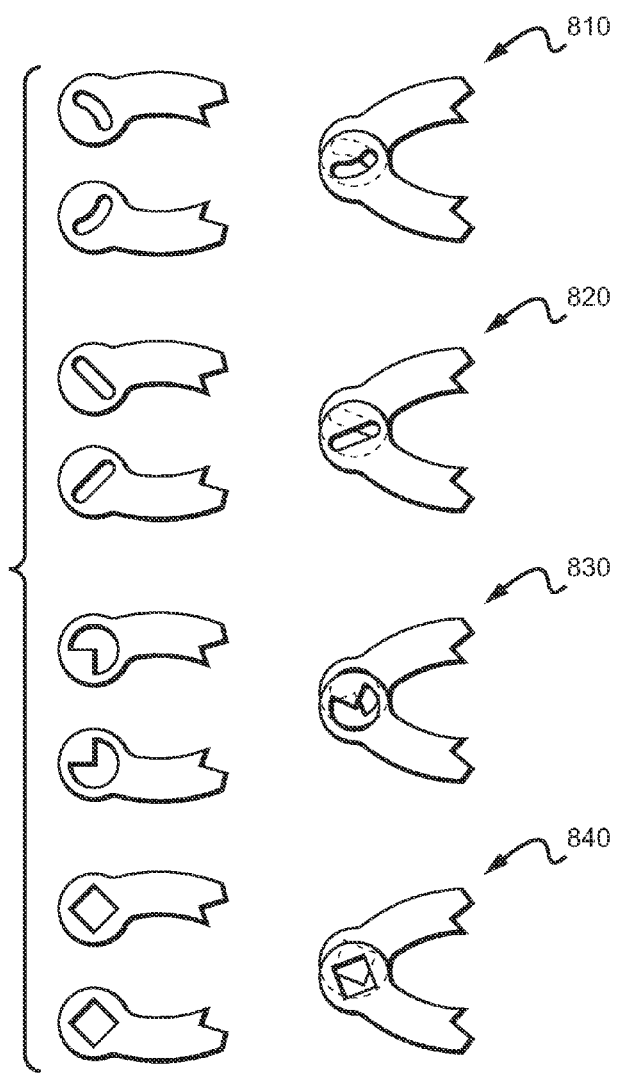
FIG. 9 shows various shapes for half-clamp openings.

FIG. 9 shows four different embodiments for half-clamp openings. Each embodiment is shown in a non-overlapping position and in a partially overlapping position. The openings of embodiment 810 have an elongated C-shape. The openings of embodiment 820 have a rectangular shape. The openings of embodiment 830 have a pac-man shape. The openings of embodiment 840 have a diamond shape. One of skill in the art will appreciate that numerous shapes, sizes, orientations, and configurations of openings can be used consistently with the inventive concepts taught herein. One of skill in the art will also appreciate that non-identical openings can be included in a tie-down device.

FIGS. 10a and 10b show a tie-down device 1000 having a linear coupler 1130. Coupler 1130 comprises two rods permanently affixed to a first half-clamp 1110 and configured to pass through holes on a second half-clamp 1120. Coupler 1130 is thus configured to allow half-clamps 1110 and 1120 to move linearly with respect to one another. Tie-down device 1000 also has a first lining 1105 and a second lining 1115 configured to come into juxtaposing contact 1157. Linings 1105 and 1115 are sized and dimensioned to make contact when openings 1107 and 1117 are in a partially overlapping position 1177. Coupler 1130 shows how non-pivoting couplings can be used consistently with the inventive subject matter. It is further contemplated that hybrid linear-pivotal couplers can be used, as well as non-pivoting and non-linear couplers.

One of skill in the art will appreciate that numerous combinations of values for (i) the angle of inclination of the opposing surfaces of the openings, (ii) the elasticity of the linings, and (iii) the size and dimensions of the linings, half-clamps, and half-clamp openings are possible and can be adjusted or optimized depending on the application. For example, where a "soft griping" tie-down device is desired, a high elasticity lining (e.g., sponge) and a small angle of inclination can be selected. When a "hard grip" tie-down device is desired, a low elasticity lining (e.g., hard rubber) and a large angle of inclination can be selected. Moreover, the linings can be sized such that they come into juxtaposing contact when the openings have just barely begun to overlap, when the openings are almost completely overlapping, or somewhere in between.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A tie-down device for a vehicle comprising:
a first half-clamp having a first opening and a first lining;
a second half-clamp having a second opening and a second lining, wherein the second half-clamp is rotatably coupled to the first half-clamp at a pivot point such that the first opening and the second opening are transitionable between a non-overlapping position and a partially overlapping position;
wherein the pivot point comprises (i) a hinge pin projected from an end of the first half-clamp to an end of the second half-clamp, and (ii) a bushing disposed between the hinge pin and the first half-clamp and the second half-clamp; and
wherein the first lining and the second lining are sized and dimensioned to directly contact one another when the first opening and the second opening are in the partially overlapping position.

2. The tie-down device of claim 1, wherein at least one of the first lining and the second lining has an elastic deformation range suitable for permitting the first half-clamp and the second half-clamp to securely close.

3. The tie-down device of claim 1, wherein the first half-clamp and the second half-clamp are fungible.

4. The tie-down device of claim 1, wherein the first opening and the second opening have a shape configured with opposing inclined surfaces when the first opening and the second opening are in the partially overlapping position.

5. The tie-down device of claim 4, wherein the shape is selected from the group consisting of triangular, elliptical, c-shaped, and irregular.

6. The tie-down device of claim 1, wherein the first lining is removeably coupled to the first half-clamp.

7. The tie-down device of claim 1, wherein the first lining and the second lining are permanently affixed to the first half-clamp and the second half-clamp, respectively.

8. The tie-down device of claim 1, wherein the first lining and the second lining are integral to the first half-clamp and second half-clamp, respectively.

9. The tie-down device of claim 1, wherein the first lining and the second lining have a width larger than a width of the first half-clamp and the second half-clamp in order to prevent the first half-clamp and the second half-clamp from directly contacting the vehicle.

10. The tie-down device of claim 1, wherein the first lining and the second lining are an over-molding of the first half-clamp and the second half-clamp, respectively.

11. The tie-down device of claim 1, further comprising a locking mechanism configured to maintain the first half-clamp and the second half-clamp in a closed position.

12. The tie-down device of claim 1, wherein the first lining and the second lining comprise a scratch-resistant material.

13. The tie-down device of claim 1, wherein the first lining and the second lining, when closed, each have a recessed interior surface comprising a cross-sectional shape selected from the group consisting of round, elliptical, regular polygonal, irregular polygonal, multi-lobe, and polygonal with rounded corners.

14. The tie-down device of claim 1, wherein the first lining and the second lining each have an interior surface configured to snugly grab an elongated member of the vehicle when the tie-down device is securely closed.

* * * * *